(12) United States Patent
Pennell et al.

(10) Patent No.: US 7,206,998 B2
(45) Date of Patent: *Apr. 17, 2007

(54) SYSTEM AND METHOD FOR AUTOMATICALLY LEARNING INFORMATION USED FOR ELECTRONIC FORM-FILLING

(75) Inventors: Mark E. Pennell, Austin, TX (US); Anthony Martin, Los Altos, CA (US)

(73) Assignee: Claria Corporation, Redwood City, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 09/860,876

(22) Filed: May 18, 2001

(65) Prior Publication Data

US 2002/0013788 A1    Jan. 31, 2002

Related U.S. Application Data (63) Continuation of application No. 09/436,973, filed on Nov. 9, 1999.

(60) Provisional application No. 60/107,791, filed on Nov. 10, 1998.

(51) Int. Cl.
  *G06F 7/06*    (2006.01)
(52) U.S. Cl. .............. 715/507; 715/508; 715/505; 715/506; 705/26; 705/42
(58) Field of Classification Search .............. 715/506, 715/507, 531, 508, 505; 704/251; 705/26, 705/42

See application file for complete search history.

(56) References Cited

U.S. PATENT DOCUMENTS

| | | | |
|---|---|---|---|
| 5,446,919 A | 8/1995 | Wilkins | |
| 5,794,259 A | 8/1998 | Kikinis | |
| 6,026,368 A | 2/2000 | Brown et al. | |
| 6,112,215 A * | 8/2000 | Kaply | 715/507 |
| 6,183,366 B1 | 2/2001 | Goldberg et al. | |
| 6,192,380 B1 * | 2/2001 | Light et al. | 715/505 |
| 6,199,079 B1 * | 3/2001 | Gupta et al. | 715/507 |
| 6,208,339 B1 | 3/2001 | Atlas et al. | |

(Continued)

FOREIGN PATENT DOCUMENTS

| | | |
|---|---|---|
| WO | WO 99/46701 | 9/1999 |
| WO | WO 01/90917 A2 | 11/2001 |

OTHER PUBLICATIONS

Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.

(Continued)

*Primary Examiner*—Stephen Hong
*Assistant Examiner*—Matthew Ludwig
(74) *Attorney, Agent, or Firm*—Joseph E. Root; Haynes Beffel & Wolfeld LLP (57) ABSTRACT

A method and apparatus allowing for entry of form data in a browser. In the described embodiment, a browser automation program executes on the user's computer and communicates with a browser program in order to determine when forms are encountered.

79 Claims, 9 Drawing Sheets

U.S. PATENT DOCUMENTS

| | | |
|---|---|---|
| 6,249,284 B1 | 6/2001 | Bogdan |
| 6,297,819 B1 * | 10/2001 | Furst .......................... 715/733 |
| 6,378,075 B1 | 4/2002 | Goldstein et al. |
| 6,460,042 B1 * | 10/2002 | Hitchcock et al. ............ 707/10 |
| 6,882,981 B2 * | 4/2005 | Philippe et al. ............... 705/26 |
| 6,910,179 B1 * | 6/2005 | Pennell et al. .............. 715/507 |
| 2004/0167928 A1 | 8/2004 | Anderson et al. |

OTHER PUBLICATIONS

Internet Citation: "Gator.com offers one-click shopping at over 5,000 e-commerce sites today"; Jun. 14, 1999; XP002145278; Date retrieved: Jun. 28, 2001. URL:http://www.gator.com/company/press/pr061499b.html.

* cited by examiner

| ecookie | history | cookies | order |

The Order Form

Here's how it works. Fill out and submit the following form, making sure to properly fill in your credit card information. Or, if you prefer, you can print the form (using your browser's print option) and fax it to us at (609) 448-4079. Your order will be acknowledged via email or fax, and the cookies shipped within 24 hours.

Ship To Information

100

⦿ Mr.  ○ Mrs.  ○ Ms.

First Name: [ ] ~101
Last Name: [ ] ~101
Address (line1): [ ] ~102
Address (line2): [ ]
City: [ ]
State: [ ]
Zip: [ ]
Phone: [ ] ~103
Fax: [ ]
Email: [ ] ~104

Order Information

Send me [ ] dozen Choco'runes and [ ] dozen Almo'runes.
Please send them ⦿ priority (2-3days) ○ overnight.

I understand that I will be billed $12/dozen ecookies plus $3/dozen for priority shipping and $15/dozen for overnight shipping.

Credit Card Information/Bill To Information

First Name: [ ]
Last Name: [ ]
Address (line1): [ ]
Address (line2): [ ]
City: [ ]
State: [ ]

FIG. 1

GlobeSet Wallet resides on a cardholder's desktop computer, operating with popular browsers like Netscape Navigator and Microsoft Internet Explorer.

```
┌─────────────────────────────────────────┐
│ Form Helper • One Click            [?][X]│
│  ___________               Hello |Noodle▽|─403
│ /           \                    | GATOR |
│ This is a Gator one click site. To fill in the
│ form, verifiy the information below and
│ press.         ╱─402
│        (FillIn) (Cancel)
│ 404─ Show  ⊙Home  ○Work  ○Other
│       Name:    |Noodle Macaroni Pasta|
│       Shipping:|Home              ▽|
│       Address: 100 Spaghetti Way
│                Suite 200
│                Meatball,AL 99887   405
│                United States
│       Shipping
│       Phone:  |Home (408)555-1111 X2222▽|
│       Fax:    |Home (408)555-3333      ▽|
│       Email:  |Home meisterndodle@yahoo ▽|
│       Credit
│       Card:   |NoodleAmex              ▽|
│               American Express    405
│               2345543223455432
│               Expires: 08/2004
│               Billed To: Other address
│       Phone:  |Home (408)555-1111 X2222▽|
└─────────────────────────────────────────┘
```

401, 404 label the left side; 402 points to FillIn; 405 labels shown data.

SYSTEM AND METHOD FOR AUTOMATICALLY LEARNING INFORMATION USED FOR ELECTRONIC FORM-FILLING

CROSS-REFERENCE TO RELATED APPLICATION

This application is a continuation of U.S. application Ser. No. 09/436,973, filed Nov. 9, 1999, entitled, "Method and Apparatus for Automatic Form Filling," by Mark E. Pennel and Anthony Martin which claims benefit of U.S. Provisional Application No. 60/107,791, filed Nov. 10, 1998, entitled, "Method and Apparatus for Automatic Form Filling" by Mark E. Pennell and Anthony Martin, both of which are hereby incorporated by reference.

BACKGROUND OF THE INVENTION

1. Field of the Invention

The present invention relates to the field graphical user interfaces and more particularly to a method for entering information into a form on a screen display associated with an electronic device.

2. Description of the Related Art

Many a site on the Internet's World Wide Web (hereafter "web site". "web page" or simply "site") require the entry of various information in order to gain full access to the site and the services offered by the site. For example, many commercial sites require a user to set up an account and, in doing so, to provide various levels of personal information. Typically, the information is relatively repetitive from site to site—e.g., name, address, telephone number, electronic mail (email) address, credit card number, etc. In some cases, the information must be entered each time the user attempts to use the site. In other cases, an account is actually set up for the user and maintained—the user needs only to enter the full information the first time the site is accessed.

Figure 1:
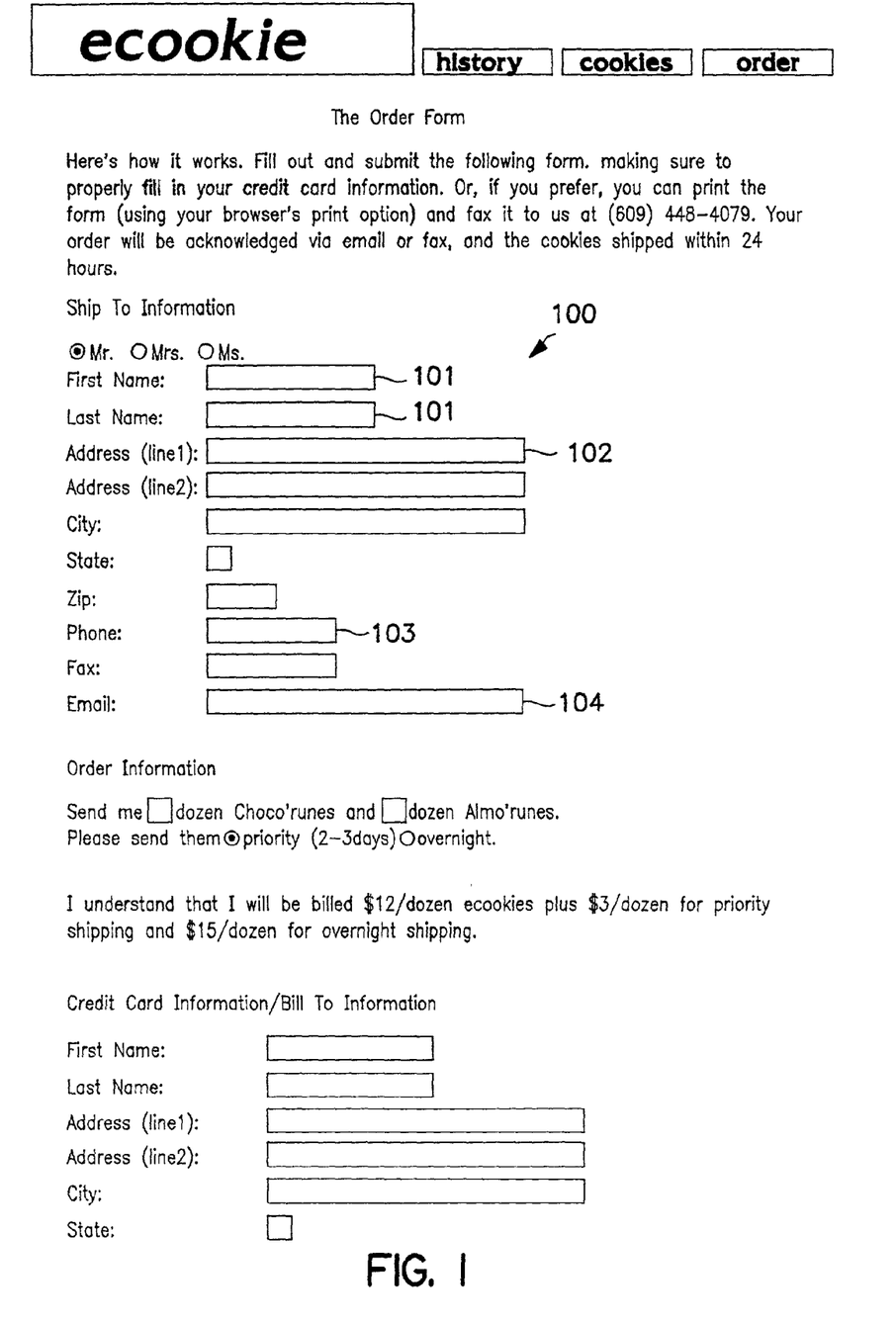
FIG. 1 is an exemplary form displayed by a web browser.

An example of an account set up screen is provided in FIG. 1. The figure illustrates a screen shot 100 of a web site accessed via, for example, web browser software executing on computing device such as a personal computer. The web site provides for online ordering, in this particular instance, of cookies. As can be seen, the user is invited to complete the shipping and billing information by visiting each data field and entering the appropriate information (e.g., name 101, address 102, phone number 103, email address 104, etc.). Alternatively, at some web sites, the user may click on a button, hyperlink, etc., to log in and fill in ordering information automatically (presuming the user has a previously set up account.)

Figure 2:
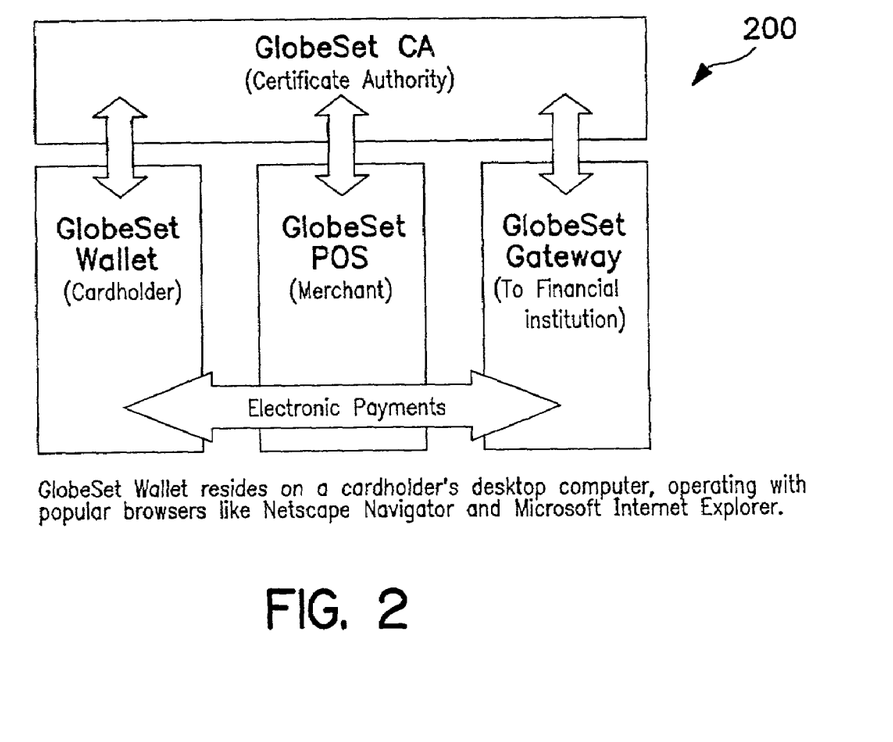
FIG. 2 illustrated a prior art wallet technology.

One method of addressing the inconvenience of repetitive data entry of account information is the so-called "wallet" technology. Using "wallets", a user may enter certain information (name, address, billing/credit card information) once and sites that run the particular wallet technology will be able to receive the information without requiring the user to reenter the data. Unfortunately, this technology requires sites to execute the wallet technology in order to allow a user to benefit from it. A diagram 200 illustrating a particular embodiment of the wallet technology is shown in FIG. 2.

One other method of addressing the inconvenience of repetitive data entry is the so-called "type-ahead" technology in which the user's computing system attempts to "remember" certain information and, if a user starts to type a sequence of characters using, for example, a keyboard or other character input device, the system attempts to recognize the character sequence and complete the sequence. For example, if the user named John Smith starts to type his name in a name field, the system may recognize the user is typing "John Smith" after the user has only typed "Joh" and automatically fill in the remaining "n Smith".

Unfortunately, the type ahead technology is limited in that it may or may not correctly recognize the phrase being typed and implementations are typically browser software dependent. Moreover, the type ahead technology requires the user to independently visit each field in a form, rather than filling in multiple fields with a single click.

Thus, it would be useful to provide a method and apparatus which reduces the inconvenience of repetitive data entry. It would be particularly useful to provide a method and apparatus which was not browser dependent and which did not require implementation by each individual web site in order to allow a user to benefit from it.

BRIEF SUMMARY OF THE INVENTION

A method and apparatus providing for improved automation for entry of data in forms displayed on a screen via a web browser.

For ease of reference, reference numerals in the accompanying drawings typically are in the form "drawing number" followed by two digits, xx; for example, reference numerals may be numbered 3xx. In certain cases, a reference numeral may be introduced on one drawing and the same reference numeral may be utilized on other drawings to refer to the same item.

DETAILED DESCRIPTION OF THE INVENTION

Figure 3:
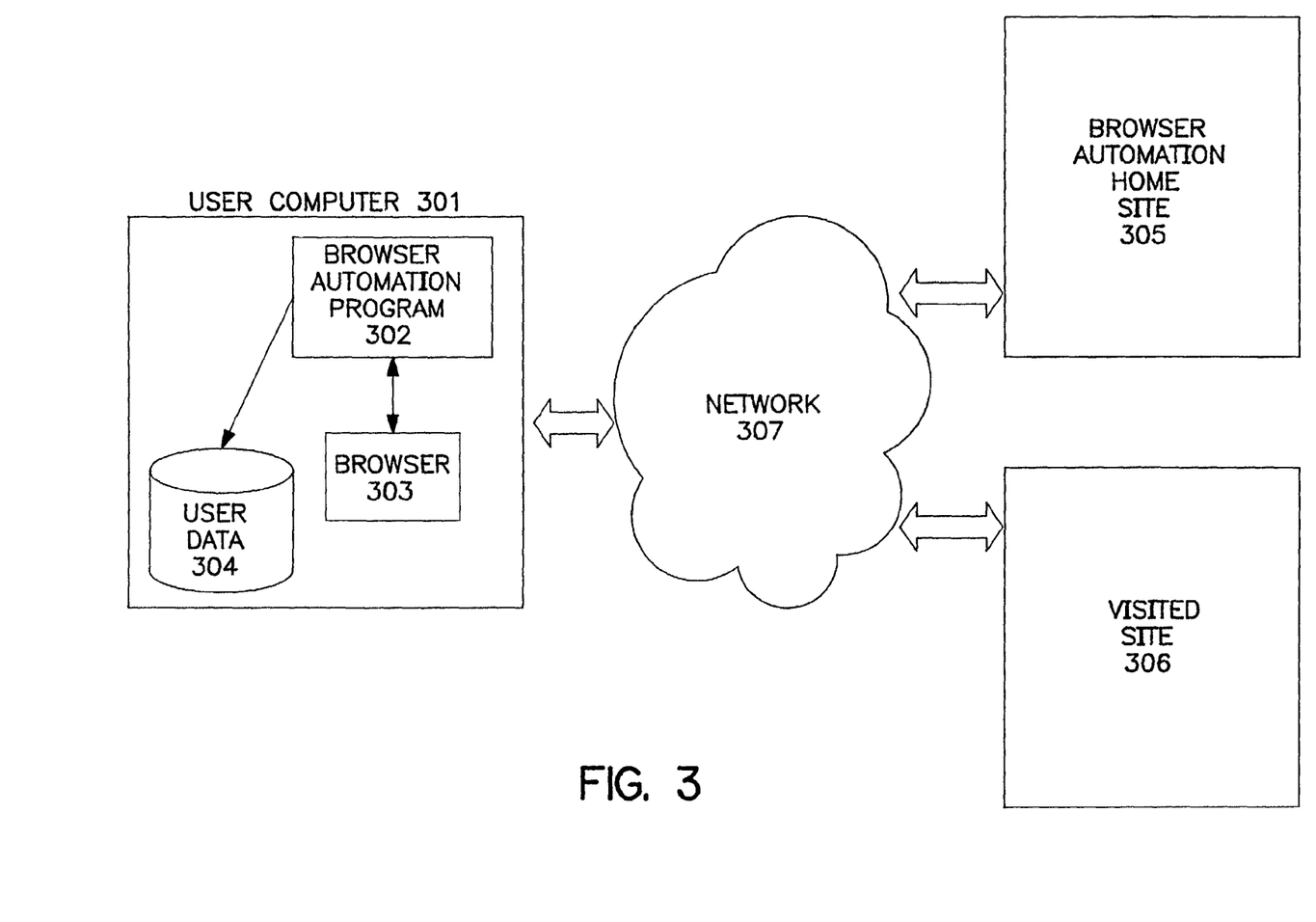
FIG. 3 illustrates a network as may utilize an embodiment of the invention.

FIG. 3 provides a diagram illustrating an overall system implementing an embodiment of the present invention. In the described embodiment, a user computing device, such as user computer 301, is automated with browser automation software 302. The browser automation software interfaces with any of a number of web browsers 303 such as Netscape Navigator available from Netscape Corporation of Mountain View, Calif. or Internet Explorer available from Microsoft Corporation of Redmond, Wash. As a user moves between web pages in the World Wide Web using browser 303, the browser automation program 302 communicates with the browser and determines the Universal Resource Locator (URL) of the web site 306 being browsed. In certain embodiments, functionality of the browser automation program 302 may be added to the browser program 303 rather than executing the automation program 302 as a separate executable program.

In the described embodiment, the browser automation program 302 may gain knowledge of the format of a form encountered on any number of web sites. For purposes of this invention, a web site for which the format of the form has been learned by the browser automation program 302 is termed a "scripted" site. One method for the browser automation program to gain this knowledge is for the user to have previously filled out the same form. The browser automation program 302 then associates the content and order of the fields for the form with the content of personal data in the user database 304 (e.g., the program 302 learns that the field named "Name" on a particular form should be associated with the user's name in the user database 304.)

A second method for the browser automation program to gain this knowledge is for the form to have been analyzed and information stored regarding the fields and expected contents. This may be done, for example, for popular or well known web sites that utilize forms. The information may be stored locally on each user's computer 301 or may be stored at a central location accessible to the user via network 307, such as the browser automation home site 305.

In an embodiment that stores this information at the home site 305, when a new URL is encountered, the home site 305 is contacted over the network 307. (It should be noted that the network could be the Internet or an intranet). In certain embodiments, information may be stored on the user's computer allowing local identification of which forms are stored at the home site 305. For example, a hash code may be developed to allow local (at the user's computer) determination of whether the form is scripted, i.e., whether information regarding the format of the form is stored, at the home site.

In addition, when encountering a form, whether for the first or a subsequent time, the browser automation program 302 may analyze the underlying structure of the form to determine if there are fields for which data is available from the user database 304. Typically, this process may involve analyzing the HyperText Markup Language (HTML), eXtensible Markup Language (XML), or other underlying code received from the visited web site 306.

Figure 4:
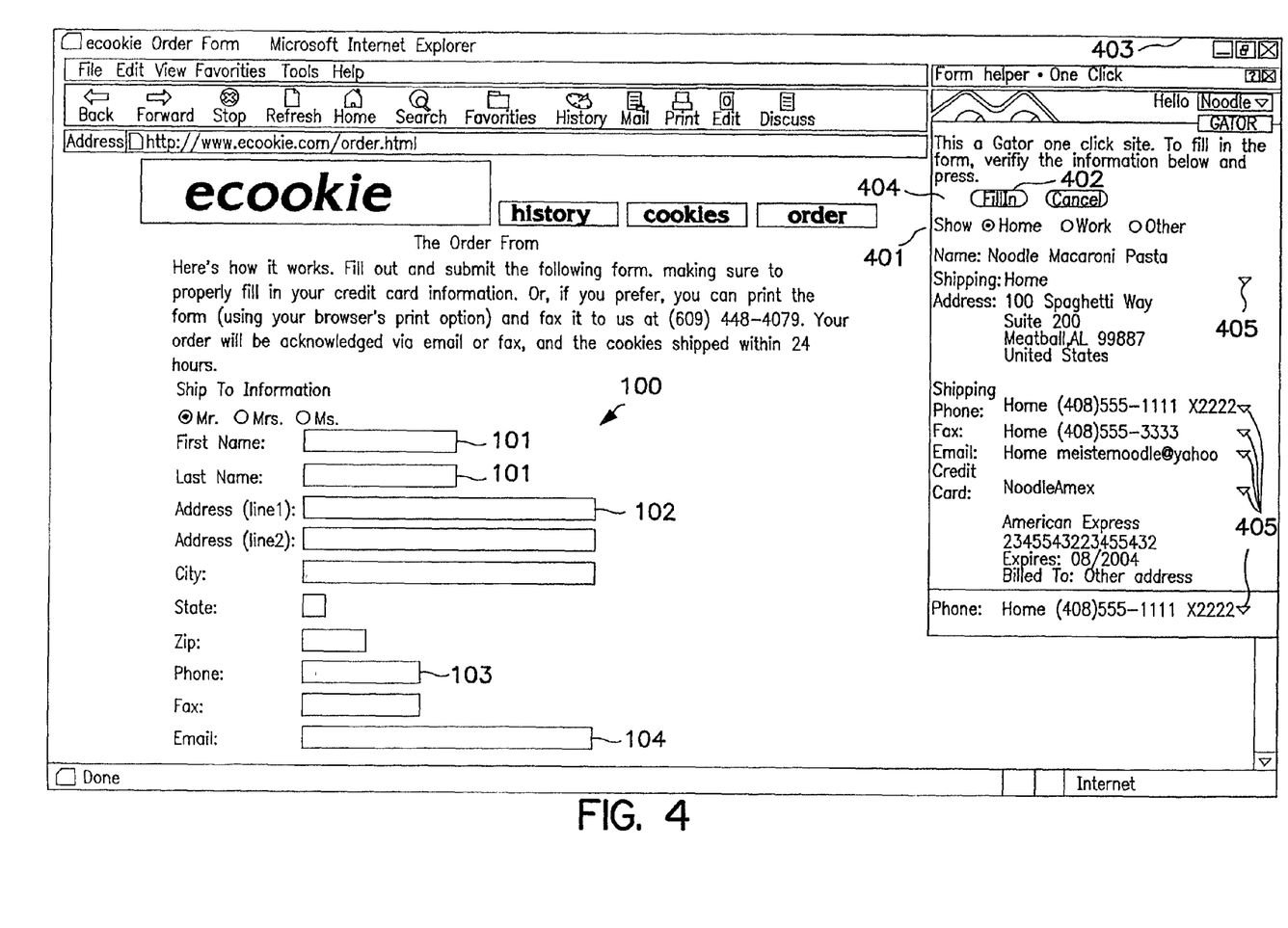
FIG. 4 illustrates a form helper window as may be utilized by an embodiment of the present invention.
Figure 7:
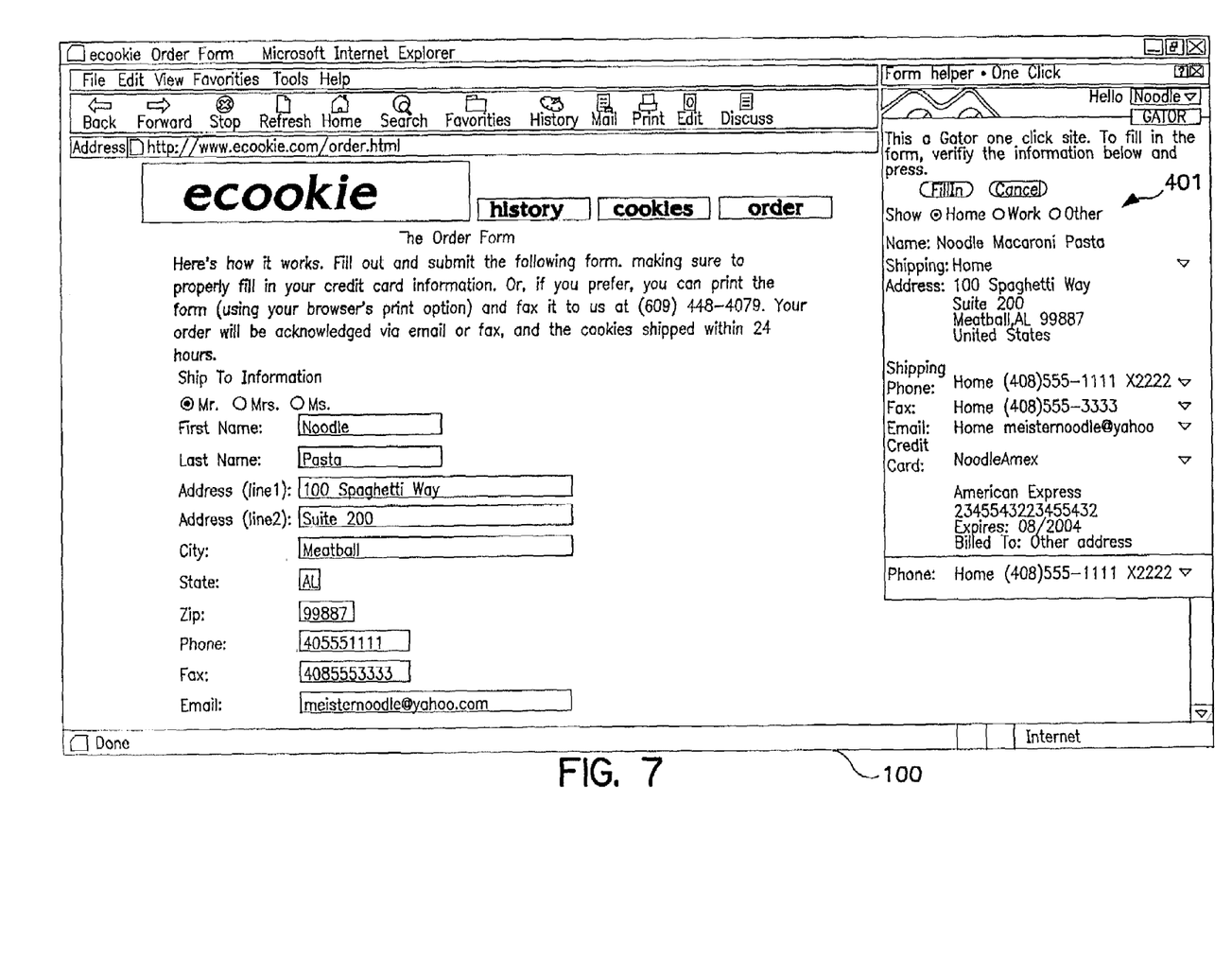
FIG. 7 illustrates a form helper window as may be utilized by an embodiment of the present invention.

Regardless of the method, if a script is available for the form, a pop up dialog window 401 is displayed in conjunction with the visited web site. An example in FIG. 4 shows pop up window 401 overlaying a portion of a visited web site, for which a partial screen shot 100 is illustrated. The pop up window 401 allows the user to automatically place the information displayed in the fields of the pop up window into the corresponding fields of the form provided at the web page that is displayed on the screen of the user's computer. The user may supply all of the listed information in pop up window 401 or may modify some or all of it before supplying it to the form. FIG. 7 illustrates a web page form 100 filled in automatically by selecting the "fill in" button.

Figure 5:
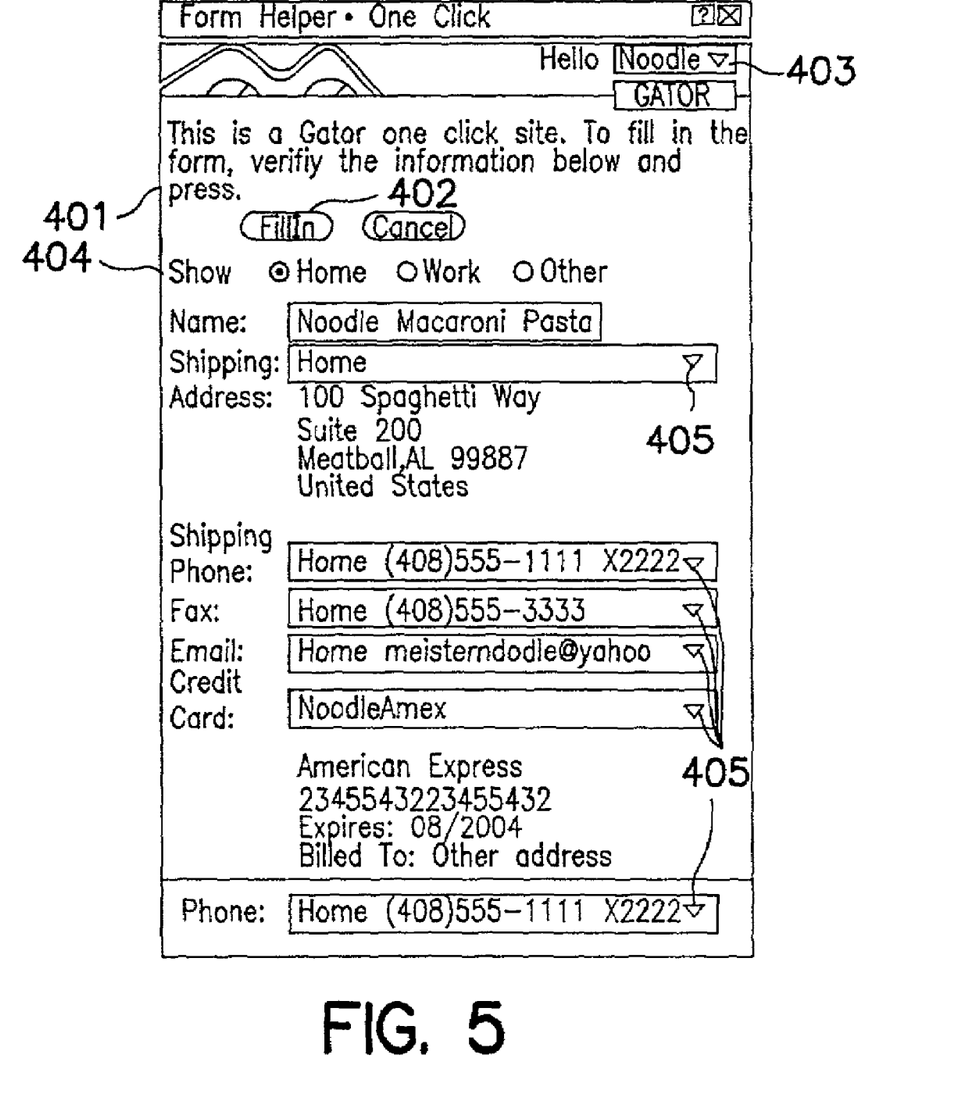
FIG. 5 illustrates a form helper window as may be utilized by an embodiment of the present invention.

The pop up window 401 is better viewed with reference to FIG. 5. The user may supply the necessary information for the form provided at the scripted site by selecting the "fill in" button 402 of pop up window 401 (assuming a script exists for the form or alternatively the program 302 can gain sufficient knowledge of the form from analyzing the underlying HTML). The "fill in" button may be selected, for example, by performing a single click of a user input device such as a mouse. Alternatively, if the browser automation program 302 is unfamiliar with the form, the user is provided with the pop up window 601 shown in FIG. 6. (FIG. 6 does not illustrate the form for which information displayed in pop up window 601 may be supplied). Pop up window 601 generally is utilized the first time a form is encountered, so that the user may select each of the individual fields in the window. The user may double click on any one particular field in pop up window 601 to supply only that field of information to the form. That information is supplied, in particular, to the currently focused field in the form displayed by the browser. The browser automation software then causes the browser to automatically advance the focus to the next field in the form, in a step wise fashion. For example, if the user double clicks on the name field 602, only the name field is supplied from the pop up window to the name field 101 in the form displayed on screen 100. Alternatively, the user may "drag and drop" the contents of a field in pop up window 601 to the corresponding field in the form displayed on screen 100.

Figure 6:
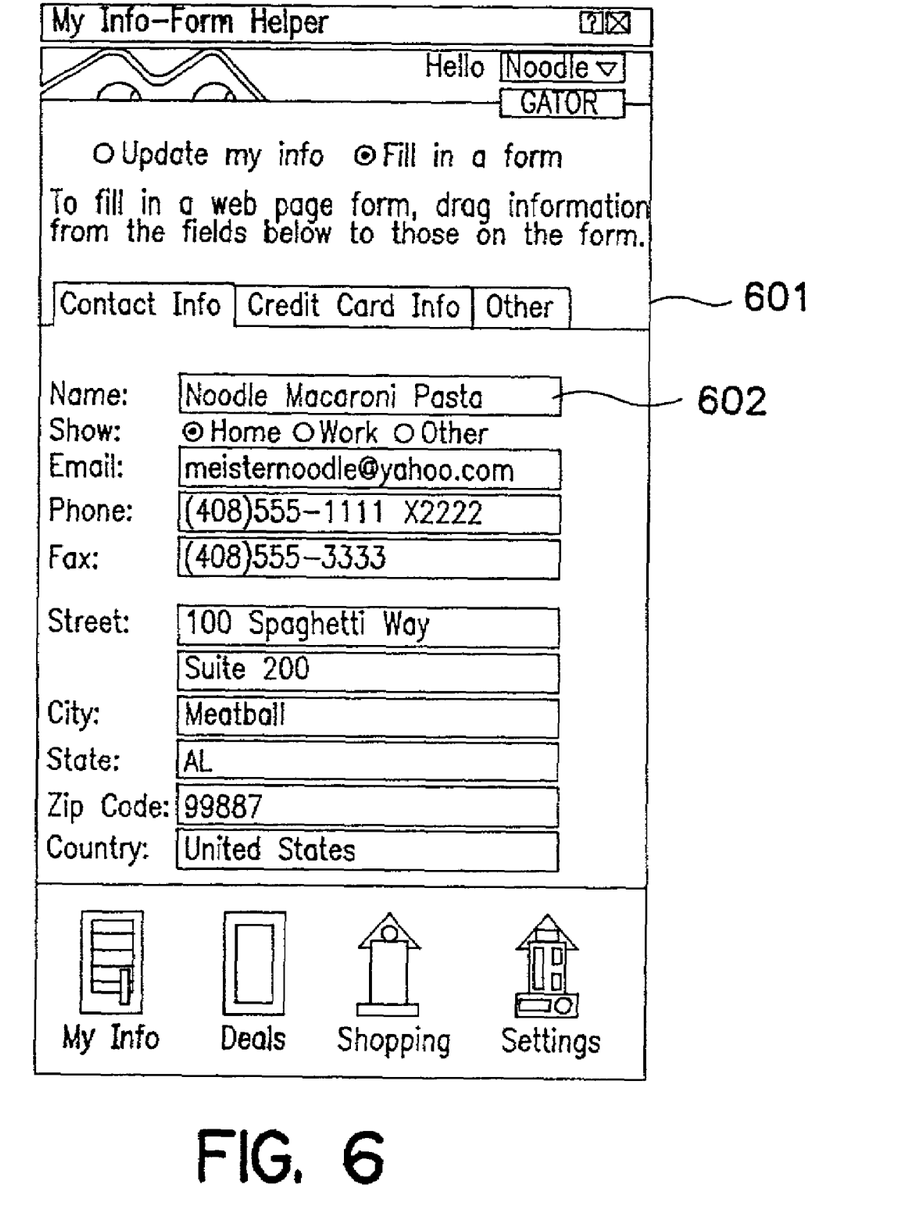
FIG. 6 illustrates a form helper window as may be utilized by an embodiment of the present invention.

It should be further noted that the pop up windows illustrated in FIGS. 5 and 6 provide for multiuser support. For example, if multiple individuals share the same computer or web browser software, information about each user may be stored and subsequently accessed by supplying a uniquely identifying user name as input to the browser automation program 302. A user can select their data by specifying their name at field 403 in pop up window 401. In one embodiment, field 403 is set up as a pull down list providing for the ability to select one of multiple users or to add a new user.

Moreover, for each user, any one of a number of profiles 404 may be provided from which to select to fill in the form. For example, the user may click on different profiles for home, work, or other. The multiple profiles allow for different sets of data to be input into the form, e.g., shipping address, phone, fax, and email address. For instance, depending on whether the user desires to communicate with the provider of the web site from home, work, or some other logical or physical designation, the user can select a desired profile to provide the appropriate information necessary for the web site provider to communicate or transact with the user accordingly. FIG. 4 illustrates the user's home profile is selected.

Yet further flexibility is provided by the browser automation program in utilizing pull down lists 405 for many of the fields of personal information accessible via pop up window 401. The user may specify one of multiple shipping addresses, phone numbers, email addresses, etc, for each profile. Thus, if a user maintains multiple offices and wishes to register or otherwise communicate personal contact information to a particular web site, the user may specify one particular office address. The user may then register at another web site using a different office address, by selecting a different office address via the pull down list associated with the shipping address field in the pop up window 401.

The information displayed in the pop up window 401 may have been initially supplied directly by the user or may have been learned as the user entered data in the normal course of filling out forms on web pages. The data is stored, typically in an encrypted format, on the user's computer 301 as user data in database 304. When the browser automation program 302 is executed, the user is asked for a password in order to access the encrypted data. In one embodiment, the data is stored in a separate file which may be copied by the user and transported from computer to computer. In one embodiment, the data within the file 304 is retained with time stamp information. Using the timestamp information, the browser automation program 302 may merge two user data files, keeping the most recent information from both files.

In addition to assisting in completing relatively long forms as was shown in FIGS. 4-7, the browser automation program 302 can assist with other types of forms 800. An example is provided in FIG. 8 in which a "login helper" pop up dialog window 801 is displayed overlaying login screen 800. For ease of reference, dialog window 801 is shown separately in FIG. 9 as well. The browser automation program 302 has learned the user's login names and passwords for given web sites (in this case, the Microsoft msn Hotmail web site). One problem increasingly facing web users is the need to remember not only many passwords but also many user identifications, or "member names". The browser automation program stores in the user data file 304 the login member names and passwords (in an encrypted format) for sites for which the user has registered. When the user accesses the URL for a site, the user is presented with the login helper 801. Login helper 801 allows the user to select the appropriate member name and automatically then enters the correct password for the user. Of course, the user may have multiple member names for a particular site and the browser automation programs 302 store each of the various member names. The user may select the desired member name from a pull down list 802 in pop up window 801. Note also that, as in the case of pop up window 401, login helper window 801 provides for multiuser support, by allowing a user to select from one of multiple users via pull down list 803.

Figure 8:
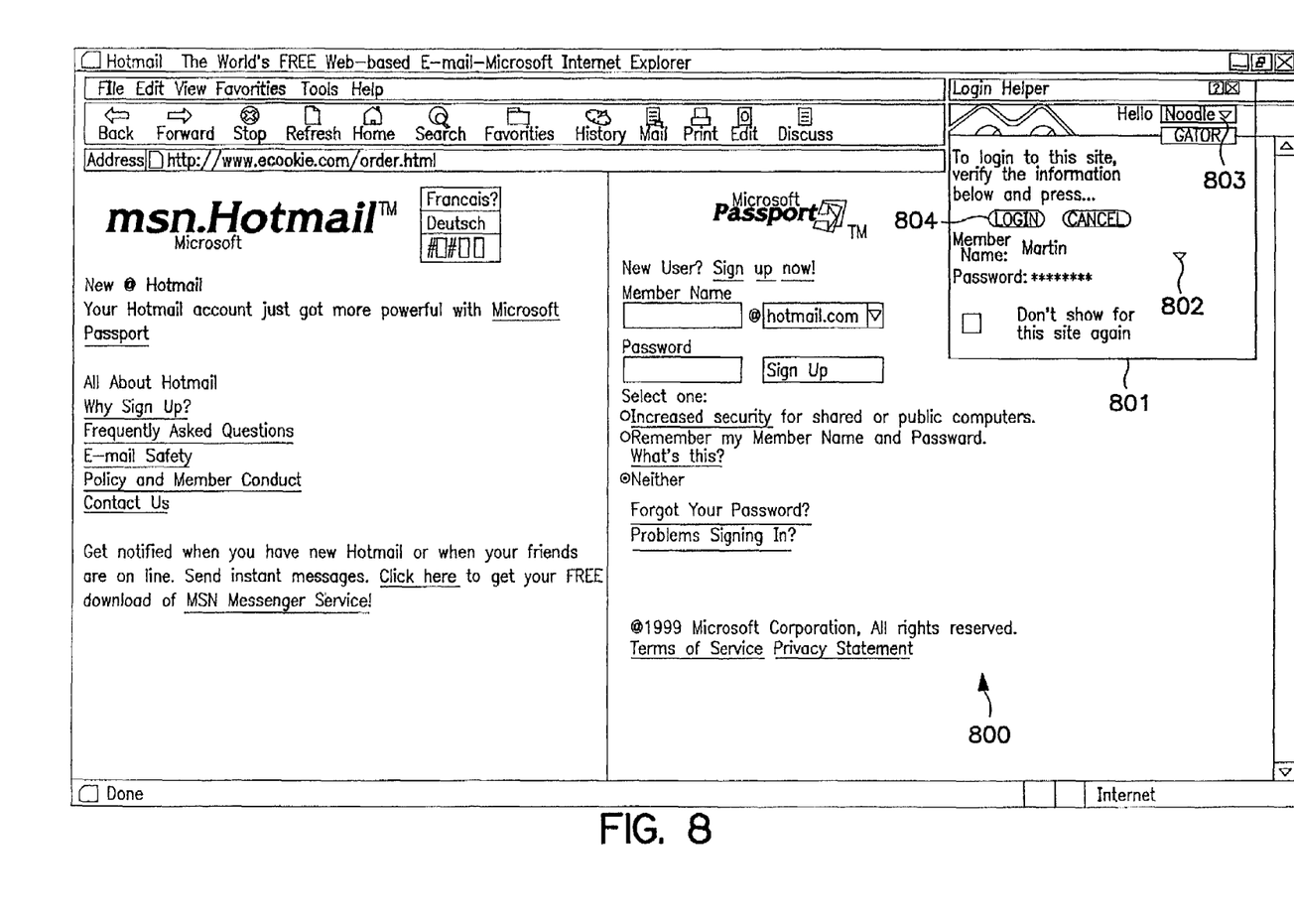
FIG. 8 illustrates a login helper window as may be utilized by an embodiment of the present invention.
Figure 9:
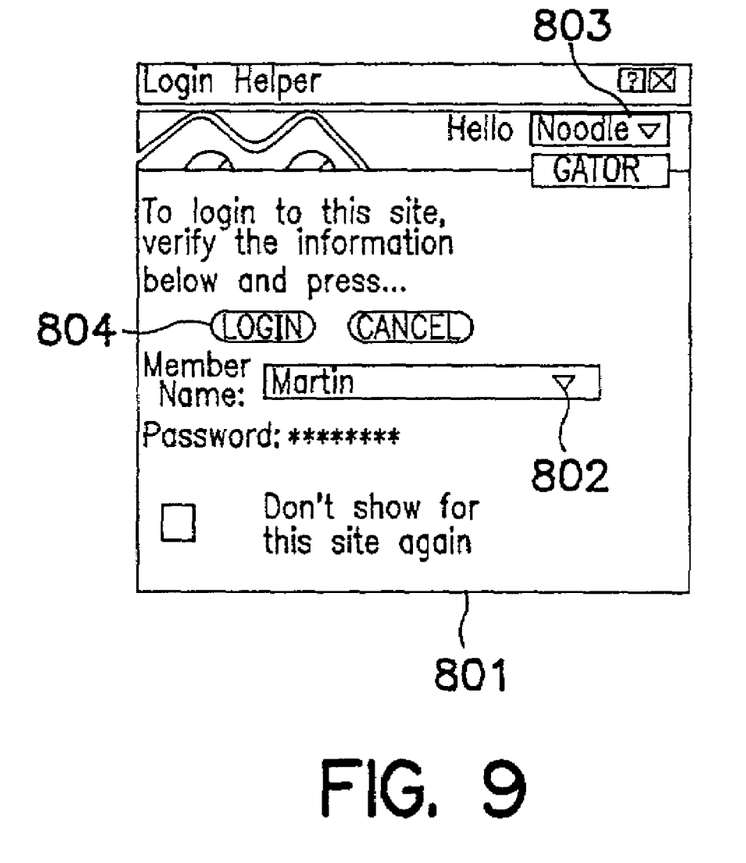
FIG. 9 illustrates a login helper window as may be utilized by an embodiment of the present invention.

The user may be provided with the option of having the form filled in by selecting the login button 804, for example, via a single click of a mouse pointer device. Thus, for example, when a login form is encountered, the browser automation program 302 may fill in the form with a minimum number of keystrokes or input from the user to log in to the site.

In one embodiment, changes to the information stored in the user database 304 causes notifications to be automatically sent to web sites which have been supplied with this data. Thus, for example, if the user changes the home address information, information may be sent to those web sites which have been previously supplied with the user's home address information notifying the web sites of the change. The appropriate scripts for updating this information may be stored, for example, at the home site 305.

What is claimed is:

1. A method, comprising:
    receiving a request for user data, the request being presented as an electronic form;
    determining whether a script for inputting the user data into the electronic form is available;
    if a script is determined to be available:
    displaying a dialog window containing the user data, wherein the dialog window allows for input of the user data into the electronic form and allows for modification of the user data, and
    if a script is determined not to be available:
    capturing information corresponding to the user data entered into the electronic form and a format of the electronic form;
    obtaining an electronic-form identifier for identifying the electronic form, the electronic form identifier identifying a location from which the electronic form was received;
    storing the electronic-form identifier and the information corresponding to the user data entered into the electronic form for future use; and
    sending, via a network, the electronic-form identifier and the captured information about the format of the electronic form to a remote location.

2. The method of claim 1, wherein the electronic form is received from a visited network site that is connected to a user computer.

3. The method of claim 1, wherein the electronic form is available on a computer used by the user.

4. The method of claim 1, wherein the request for user data includes a request for at least one of personal information, user attribute information, contact information, login information, account information, membership information, or credit information.

5. The method of claim 1, wherein the electronic form includes multiple data fields, each data field being a request for a piece of user data.

6. The method of claim 1, wherein the electronic form is a login window.

7. The method of claim 1, wherein the electronic form is a purchase order.

8. The method of claim 1, wherein the captured information corresponding to the user data includes user-data identifiers.

9. The method of claim 1, wherein the captured information corresponding to the user data includes user-data types.

10. The method of claim 1, wherein the captured information corresponding to the user data includes the user data.

11. The method of claim 1, wherein the captured information corresponding to the user data includes the order of entry of the user data into the electronic form.

12. The method of claim 2, wherein the electronic-form identifier includes a URL of the visited network site.

13. The method of claim 1, wherein the electronic-form identifier includes an identifier assigned to the electronic form.

14. The method of claim 1, wherein the electronic-form identifier includes electronic-form attributes.

15. The method of claim 14, wherein the electronic form includes data fields having an order and wherein the electronic-form attributes include the order of the data fields.

16. The method of claim 1, wherein the information corresponding to the user data is stored in a database on a user computer.

17. The method of claim 1, wherein the information corresponding to the user data is stored in a remote database.

18. A system, comprising:
    a browser for receiving a request for user data, the request being presented as an electronic form;
    a processor having logic for determining whether a script for inputting the user data into the electronic form is available;
    if a script is determined to be available;
    a processor having logic for displaying a dialog window containing the user data, wherein the dialog window allows for input of the user data into the electronic form and allows for modification of the user data; and
    if a script is determined not to be available:
    logic for capturing information corresponding to the user data entered into the electronic form and information corresponding to a format of the electronic form;
    a communications engine for obtaining an electronic-form identifier for identifying the electronic form;
    a storage medium for storing the electronic-form identifier and the information corresponding to the user data entered into the electronic form for future use; and logic for sending, via a network, the electronic-form identifier and the captured information about the format of the electronic form to a remote location.

19. The system of claim 18, wherein the browser receives the electronic form from a visited network site that is connected to a user computer.

20. The system of claim 19, wherein the electronic-form identifier includes a URL of the visited network site.

21. The system of claim 18, wherein the electronic form is available on a computer used by the user.

22. The method of claim 18, wherein the request for user data includes a request for at least one of personal information, user attribute information, contact information, login information, account information, membership information, or credit information.

23. The system of claim 18, wherein the electronic form includes multiple data fields, each data field being a request for a piece of user data.

24. The system of claim 18, wherein the electronic form is a login window.

25. The system of claim 18, wherein the electronic form is a purchase order.

26. The system of claim 18, wherein the captured information corresponding to the user data includes user-data identifiers.

27. The system of claim 18, wherein the captured information corresponding to the user data includes user-data types.

28. The system of claim 18, wherein the captured information corresponding to the user data includes the user data.

29. The system of claim 18, wherein the captured information corresponding to the user data includes the order of entry of the user data into the electronic form.

30. The system of claim 18, wherein the electronic-form identifier includes an identifier assigned to the electronic form.

31. The system of claim 18, wherein the electronic-form identifier includes electronic-form attributes.

32. The system of claim 31, wherein the electronic form includes data fields having an order and electronic-form attributes include the order of the data fields.

33. The system of claim 18, wherein the storage medium storing the information corresponding to the user data is located on a user computer.

34. The system of claim 18, wherein the storage medium storing the information corresponding to the user data is located on a remote server.

35. A system including memory, comprising:
means for receiving a request for user data, the request being presented as an electronic form;
means for determining whether a script for inputting the user data into the electronic form is available;
if a script is determined to be available:
means for displaying a dialog window containing the user data, wherein the dialog window allows for input of the user data into the electronic form and allows for modification of the user data, and
if a script is determined not to be available:
means for capturing information corresponding to the user data entered into the electronic form and information corresponding to a format of the electronic form;
means for obtaining a electronic-form identifier for identifying the electronic form; and means for storing the electronic-form identifier and the information corresponding to the user data entered into the electronic form for future use; and means for sending, via a network, the electronic-form identifier and the captured information about the format of the electronic form to a remote location.

36. A computer-readable storage medium storing program code for causing a computer to:
receive a request for user data, the request being presented as an electronic form;
determine whether a script for inputting the user data into the electronic form is available; if a script is determined to be available:
display a dialog window containing the user data, wherein the dialog window allows for input of the user data into the electronic form and allows for modification of the user data; and
if a script is determined not to be available:
capture information corresponding to the user data entered into the electronic form and information corresponding to a format of the electronic form;
obtain an electronic-form identifier for identifying the electronic form;
store the electronic-form identifier and the information corresponding to the user data entered into the electronic form for future use; and
send, via a network, the electronic-form identifier and the captured information about the format of the electronic form to a remote location.

37. A method, comprising:
receiving a request for user data, the request being presented as an electronic form, the electronic form including an electronic-form identifier;
comparing the electronic-form identifier against stored electronic-form identifiers that correspond to previously filled electronic forms;
retrieving stored information corresponding to a stored electronic-form identifier if a match is found, the stored information including a script associating content and order of data fields in the electronic form with user data to be entered into at least a portion of the data fields;
displaying a dialog window containing the user data, wherein the dialog window allows for input of the user data into the electronic form and allows for modification of the user data; and
contacting a remote location utilizing a network if a match is not found.

38. The method of claim 37, further comprising: using the script retrieved to enter user data in the electronic form automatically.

39. The method of claim 38, further comprising: presenting the user data in the received electronic form.

40. The method of claim 39, further comprising: permitting the user to modify the user data presented.

41. The method of claim 38, further comprising: presenting the user data to a user in a dialog window.

42. The method of claim 41, further comprising: enabling the user to transfer available user data from the dialog window to the electronic form by drag and drop mechanism.

43. The method of claim 41, further comprising:
enabling the user to transfer user data from the dialog window to the electronic form by highlighting a field in the electronic form and selecting a user data piece to be transferred from the dialog window.

44. The method of claim 37, wherein the browser receives the electronic form from a visited network site that is connected to a user computer.

45. The method of claim 37, wherein the electronic form is available on a user computer.

46. The method of claim 37, wherein the request for user data includes a request for at least one of personal information, user attribute information, contact information, login information, account information, membership information, or credit information.

47. The method of claim 37, wherein each data field of the electronic form comprises a request for a piece of user data.

48. The method of claim 37, wherein the electronic form is a login window.

49. The method of claim 37, wherein the electronic form is a purchase order.

50. The method of claim 37, wherein the electronic-form identifier includes a URL of the visited network site and the stored electronic-form identifiers each include a URL of a previously visited network site.

51. The method of claim 37, wherein the electronic-form identifier includes an identifier assigned to the electronic form and the stored electronic-form identifiers each include an identifier assigned to a previously filled electronic form.

52. The method of claim 37, wherein the electronic-form identifier includes electronic form attributes and the stored electronic-form identifiers each include attributes of a previously filled electronic form.

53. The method of claim 37, wherein the stored information includes user data identifiers, and further comprising retrieving stored user data corresponding to the user data identifiers.

54. The method of claim 37, wherein the stored information includes user data types further comprising retrieving stored user data types, and further comprising retrieving stored user data corresponding to the user data types.

55. The method of claim 37, wherein the stored information includes the user data.

56. The method of claim 37, further comprising retrieving stored user data corresponding to the order of the data fields.

57. A system, comprising:
- a browser for receiving a request for user data, the request being presented as an electronic form, the electronic form including an electronic-form identifier;
- a processor having logic for comparing the electronic-form identifier of the electronic form against stored electronic-form identifiers corresponding to previously filled electronic forms;
- an engine for retrieving stored information corresponding to the received electronic form if a match is found, the stored information including a script associating content and order of data fields in the electronic form with user data to be entered into at least a portion of the data fields;
- an engine for displaying a dialog window containing the user data, wherein the dialog window allows for input of the user data into the electronic form and allows for modification of the user data; and
- logic for contacting a remote location utilizing a network if a match is not found.

58. The system of claim 57, further comprising: the processor having logic for using the stored information retrieved to enter user data in the electronic form automatically.

59. The system of claim 58, farther comprising: a user interface for presenting the user data.

60. The system of claim 59, wherein the processor for permitting a user to modify the user data presented.

61. The system of claim 59, wherein the user interface presents available user data in a dialog window and the processor enables a user to transfer user data from the dialog window to the electronic form by drag and drop mechanism.

62. The system of claim 59, wherein the user interface presents available user data in a dialog window and the processor enables the user to transfer user data from the dialog window to the electronic form by highlighting a field in the electronic form and by selecting a user data piece to be transferred from the dialog window.

63. The system of claim 57, further comprising: a storage medium for storing the information corresponding to the received electronic form.

64. The system of claim 57, wherein the browser receives the electronic form from a visited network site that is connected to a user computer.

65. The system of claim 57, wherein the browser obtains the electronic form from a computer used by the user.

66. The method of claim 57, wherein the request for user data includes a request for at least one of personal information, user attribute information, contact information, login information, account information, membership information, or credit information.

67. The system of claim 57, wherein each data field of the electronic form comprises a request for a piece of user data.

68. The system of claim 57, wherein the electronic form is a login window.

69. The system of claim 57, wherein the electronic form is a purchase order.

70. The system of claim 57, wherein the electronic-form identifier includes a URL of the visited network site.

71. The system of claim 57, wherein the electronic-form identifier includes an identifier assigned to the electronic form.

72. The system of claim 57, wherein the electronic-form identifier includes electronic form attributes.

73. The system of claim 57, wherein the stored information includes user data identifiers.

74. The system of claim 57, wherein the stored information includes user data types.

75. The system of claim 57, wherein the stored information includes the user data.

76. A system including memory, comprising:
- means for receiving a request for user data, the request being presented as an electronic form, the electronic form including an electronic-form identifier;
- means for comparing the electronic-form identifier of the electronic form against stored electronic-form identifiers corresponding to previously filled electronic forms;
- means for retrieving stored information corresponding to the received electronic form if a match is found, the stored information including a script associating content and order of data fields in the electronic form with user data to be entered into at least a portion of the data fields;
- means for displaying a dialog window containing the user data, wherein the dialog window allows for input of the user data into the electronic form and allows for modification of the user data and
- means for contacting a remote location utilizing a network if a match is not found.

77. The method of claim 76, further comprising: means for using the retrieved stored information to enter user data into the electronic form automatically.

78. A computer-readable storage medium storing program code for causing a computer to:
- receive a request for user data, the request being presented as an electronic form, the electronic form including an electronic-form identifier;
- compare the electronic-form identifier of the electronic form against stored electronic-form identifiers corresponding to previously filled electronic forms;
- retrieve stored information corresponding to the received electronic form if a match is found, the stored information including a script associating content and order of data fields in the electronic form with user data to be entered into at least a portion of the data fields;

display a dialog window containing the user data, wherein the dialog window allows for input of the user data into the electronic form and allows for modification of the user data; and contact a remote location utilizing a network if a match is not found.

79. The computer-readable storage medium storing program code of claim 78, to further cause a computer to:
use the stored information retrieved to enter user data in the electronic form automatically.

* * * * *